(12) United States Patent
Lin et al.

(10) Patent No.: US 10,923,028 B2
(45) Date of Patent: Feb. 16, 2021

(54) DISPLAY PANEL

(71) Applicant: Au Optronics Corporation, Hsinchu (TW)

(72) Inventors: Yu-Shian Lin, Hsinchu (TW); Po-Sheng Liao, Hsinchu (TW); Ying-Ying Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/679,245

(22) Filed: Nov. 10, 2019

(65) Prior Publication Data

US 2020/0349886 A1    Nov. 5, 2020

(30) Foreign Application Priority Data

May 2, 2019    (TW) ............... 108115303 A (51) Int. Cl.
*G09G 3/3225* (2016.01)
*G02F 1/1339* (2006.01)

(52) U.S. Cl.
CPC ......... *G09G 3/3225* (2013.01); *G02F 1/1339* (2013.01); *G09G 2300/0408* (2013.01); *G09G 2300/0426* (2013.01)

(58) Field of Classification Search
CPC ............ G02F 1/1339; G02F 1/136286; G09G 3/3225; G09G 2300/0408;
(Continued)

(56) References Cited

U.S. PATENT DOCUMENTS 9,748,515 B2 * 8/2017 Hong ............... H01L 51/5246
10,541,380 B1 * 1/2020 Sung .............. H01L 21/76205
(Continued)

FOREIGN PATENT DOCUMENTS

| CN | 108648620 | 10/2018 |
| CN | 109375437 | 2/2019 |

OTHER PUBLICATIONS

"Search Report of Singapore Counterpart Application", dated Oct. 7, 2020, p. 1-p. 2.
(Continued)

*Primary Examiner* — Mihir K Rayan
(74) *Attorney, Agent, or Firm* — JCIPRNET (57) ABSTRACT

A display panel including a substrate, pixel structures, multiple first and second signal lines, signal transfer lines and a sealant pattern is provided. The substrate has a package region, a display region surrounding the package region and a transfer region positioned between the package region and the display region. The pixel structures, the first and second signal lines are disposed in the display region and each pixel structure is electrically connected to one corresponding first and second signal line. The signal transfer lines are disposed in the package region and electrically connected to the first signal lines. The coefficient of thermal expansion of the signal transfer lines is smaller than the first signal lines. The sealant pattern disposed in the package region is overlapped with the signal transfer lines. A display panel including a signal transfer line whose coefficient of thermal expansion is between $4.8(10^{-6}/K)$ and $14.2(10^{-6}/K)$ is also provided.

20 Claims, 7 Drawing Sheets

(58) Field of Classification Search
CPC ........ G09G 2300/0426; H01L 27/3246; H01L 27/3248; H01L 27/3262; H01L 27/3265; H01L 27/3279
See application file for complete search history.

(56) References Cited

U.S. PATENT DOCUMENTS

| | | | |
|---|---|---|---|
| 2009/0051636 A1* | 2/2009 | Natori | G09G 3/3648 345/87 |
| 2010/0060842 A1* | 3/2010 | Igeta | G02F 1/13394 349/153 |
| 2010/0137122 A1* | 6/2010 | Nagai | C03C 3/087 501/70 |
| 2012/0069241 A1* | 3/2012 | Shiau | G06F 1/1605 348/373 |
| 2013/0049062 A1* | 2/2013 | Hatano | H01L 51/5246 257/99 |
| 2017/0154566 A1* | 6/2017 | Ryoo | G02F 1/13 |
| 2017/0162111 A1* | 6/2017 | Kang | H01L 27/3276 |
| 2017/0162637 A1* | 6/2017 | Choi | G09G 3/3225 |
| 2019/0245159 A1* | 8/2019 | Kim | H01L 51/5256 |
| 2020/0110525 A1* | 4/2020 | Park | H01L 27/3223 |

OTHER PUBLICATIONS

"Written Opinion of Singapore Counterpart Application", dated Oct. 7, 2020, p. 1-p. 6.

\* cited by examiner

DISPLAY PANEL

CROSS-REFERENCE TO RELATED APPLICATION

This application claims the priority benefit of Taiwan application serial no. 108115303, filed on May 2, 2019. The entirety of the above-mentioned patent application is hereby incorporated by reference herein and made a part of this specification.

BACKGROUND OF THE DISCLOSURE

Field of the Disclosure

The present disclosure relates to a display panel, in particular to a display panel with a hole.

Description of Related Art

With the development of a display technology, besides the improvement of display quality, diversified application of a display panel is also started. Designing display panels which can be applied to different usage scenarios has become a common development situation for relevant manufacturers. In recent years, smart watches, sports bracelets, or other wearable electronic devices, for example, have shown the unlimited potential for the display panels to be used in everyday life. As a result, taste-concerned appearance design of the display panels loaded by such electronic devices has become an important part of product development in addition to high specification requirements for environmental tolerance. In order to achieve different appearance designs, the free form cutting technology of the display panels has gradually become a necessary technology for the relevant manufacturers.

At the beginning of the design of the product, in order to optimize the fit between a display panel and other components, openings corresponding to the shapes of the other components can be designed at the edge of a display region or inside the display region. For example, a display panel applied to a smart watch needs to have a hole surrounded by a display region so that a pointer of a watch core can penetrate through the display panel. However, in order to ensure package yield, a driving circuit trace adjacent to the perimeter of the hole needs to be designed to be away from the package region. In this way, the displayable region of the display panel tends to be reduced. Therefore, how to increase the range of a displayable region and improve the design margin of the appearance of the displayable region under the condition of ensuring the package yield of the display panel is the development focus of the relevant manufacturers.

SUMMARY OF THE DISCLOSURE

The present disclosure provides a display panel, and the layout space of signal lines of the display panel is large.

The present disclosure provides a display panel with a high package yield and good operation reliability.

A display panel of the present disclosure includes a substrate, a plurality of pixel structures, a plurality of first signal lines, a plurality of second signal lines, a plurality of signal transfer lines, an insulating layer and a sealant pattern. The substrate includes a package region, a display region surrounding the package region and a transfer region positioned between the package region and the display region. The pixel structures, the first signal lines and the second signal lines are disposed in the display region and each of the pixel structures is electrically connected to one corresponding first signal line and one corresponding second signal line. The signal transfer lines and the sealant pattern are disposed in the package region, and the sealant pattern is overlapped with the signal transfer lines. The coefficient of thermal expansion of the signal transfer lines is smaller than the coefficient of thermal expansion of the first signal lines. The insulating layer is disposed between the first signal lines and the second signal lines. The insulating layer is provided with a plurality of contact vias overlapped with the transfer region, and the first signal lines are electrically connected to the signal transfer lines through the contact vias.

A display panel of the present disclosure includes a substrate, a plurality of pixel structures, a first signal line, a plurality of second signal lines, a signal transfer line and a sealant pattern. The substrate includes a package region and a display region surrounding the package region. The pixel structures, the first signal line and the second signal lines are disposed in the display region, and each pixel structure is electrically connected to the first signal line and one corresponding second signal line. The signal transfer line is disposed in the package region, and is electrically connected to the first signal line. The coefficient of thermal expansion of the signal transfer line is between 4.8 ($10^{-6}$ K) and 14.2 ($10^{-6}$/K). The sealant pattern is disposed in the package region, and is overlapped with the signal transfer line.

Based on the above, in the display panel according to one embodiment of the present disclosure, the package region is provided with the signal transfer line overlapped with the sealant pattern, and the first signal line for driving the pixel structures is electrically connected to the signal transfer line. Accordingly, the display panel can transmit a driving signal from the first signal line of the display region to the signal transfer line located in the package region or transmit the driving signal from the signal transfer line of the package region to the first signal line located in the display region so as to ensure that a displayable region of the display panel is maximized. In addition, in the display panel according to another embodiment of the present disclosure, through the fact that the coefficient of thermal expansion of the signal transfer line is between 4.8 ($10^{-6}$/K) and 14.2 ($10^{-6}$/K), the signal transfer line can be prevented from being peeled off due to high temperature in a package process and causing package failure, and the package yield and the operation reliability of the display panel can be improved.

In order to make the aforementioned and other objectives and advantages of the present disclosure comprehensible, embodiments accompanied with figures are described in detail below.

DESCRIPTION OF THE EMBODIMENTS

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on measurement properties, cutting properties, or other properties to select a more acceptable range of deviations or standard deviations without one standard deviation for all properties.

In the accompanying drawings, the thicknesses of layers, films, panels, regions, and the like are enlarged for clarity. It should be understood that when a component such as a layer, film, region or substrate is referred to as being "on" or "connected" to another component, it may be directly on or connected to the another component, or intervening components may also be present. In contrast, when a component is referred to as being "directly on" or "directly connected to" another component, there are no intervening assemblies present. As used herein, "connection" may refer to a physical and/or electrical connection. Moreover, "electrical connection" refers to that other components may also be present between two components.

In addition, spatially relative terms such as "below", "bottom", "on" or "top" are used in this specification to describe a relationship between one element and another element, as shown in the figures. It should be understood that such spatially relative terms are intended to encompass different orientations of the device in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Exemplary embodiments of the present disclosure are described in detail, and examples of the exemplary embodiments are shown in the accompanying drawings. Whenever possible, the same component symbols are used in the drawings and descriptions to indicate the same or similar parts.

Figure 1:
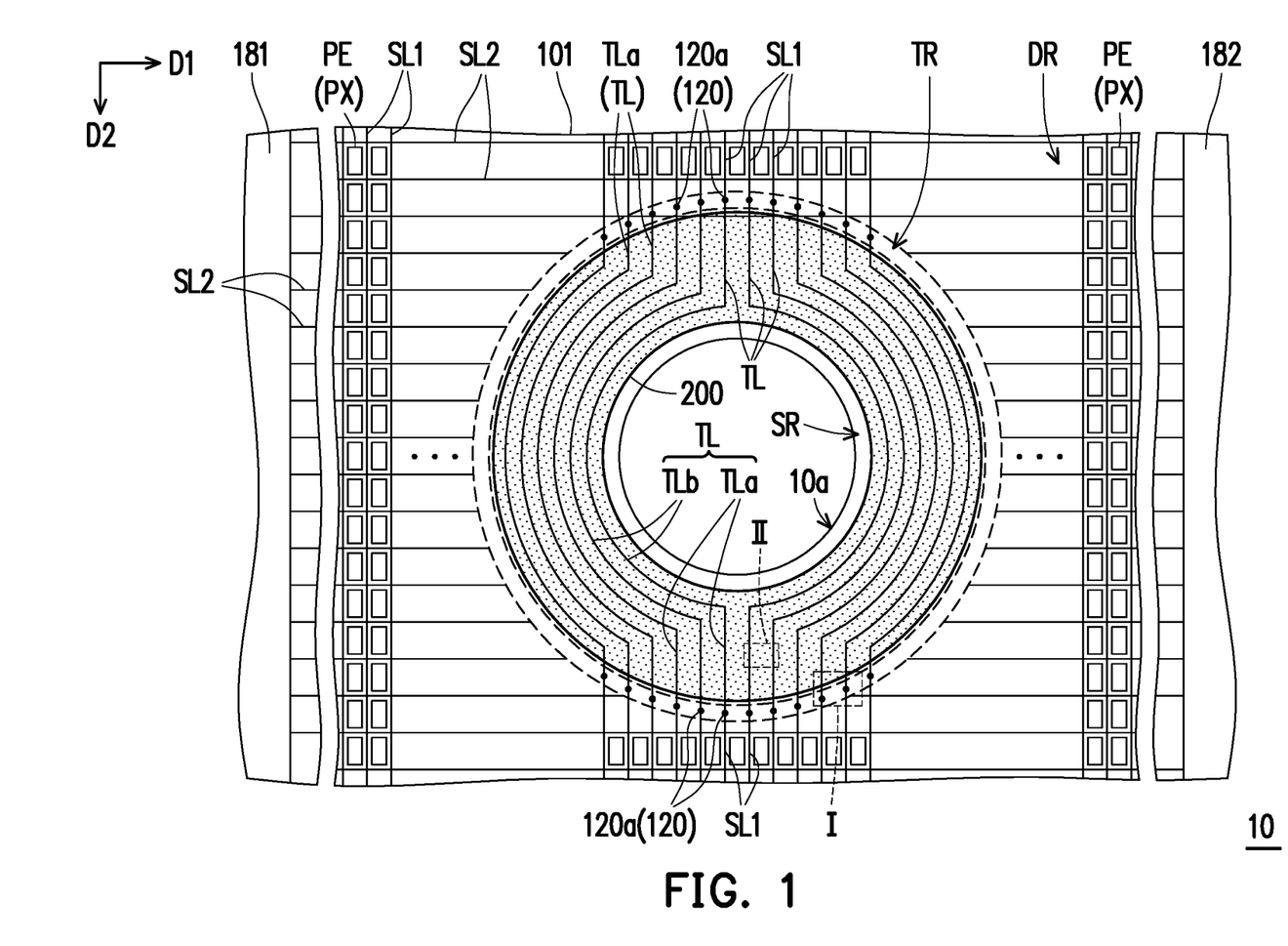
FIG. 1 is a schematic top view of a display panel according to an embodiment of the present disclosure.
Figure 2:
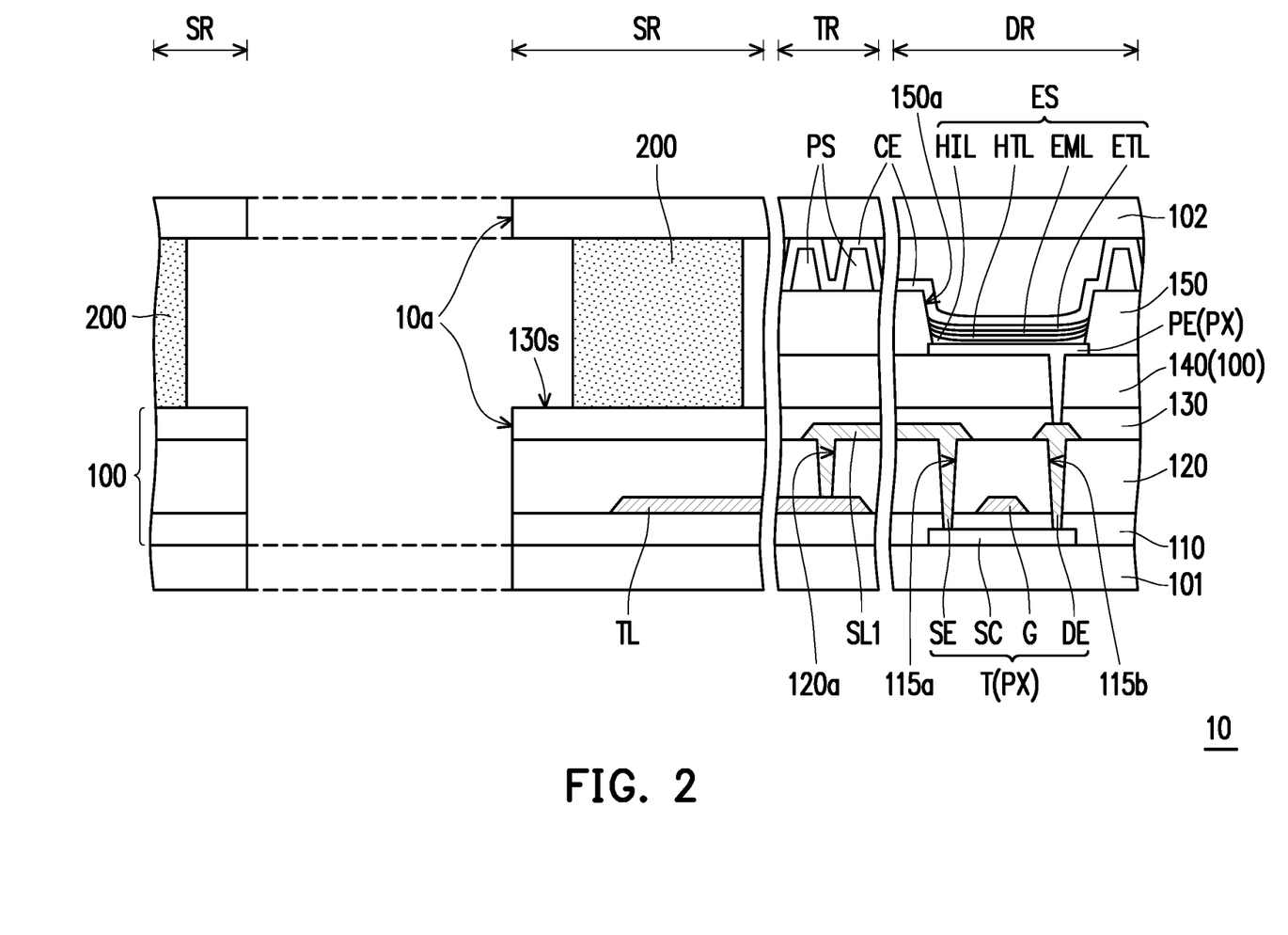
FIG. 2 is a schematic cross-sectional view of the display panel of FIG. 1.
Figure 3:
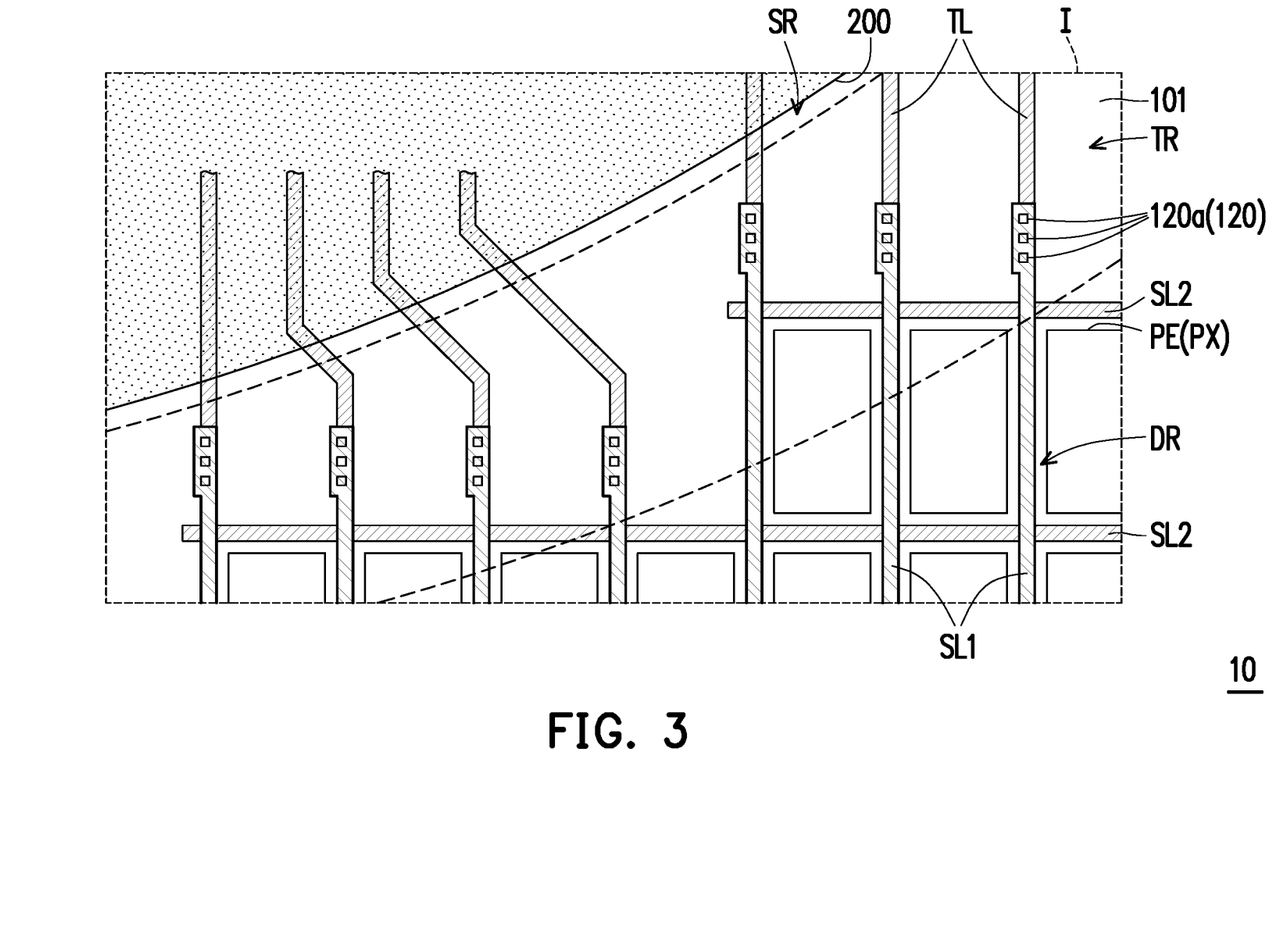
FIG. 3 and FIG. 4 are enlarged schematic views of two partial regions of the display panel of FIG. 1, respectively.
Figure 4:
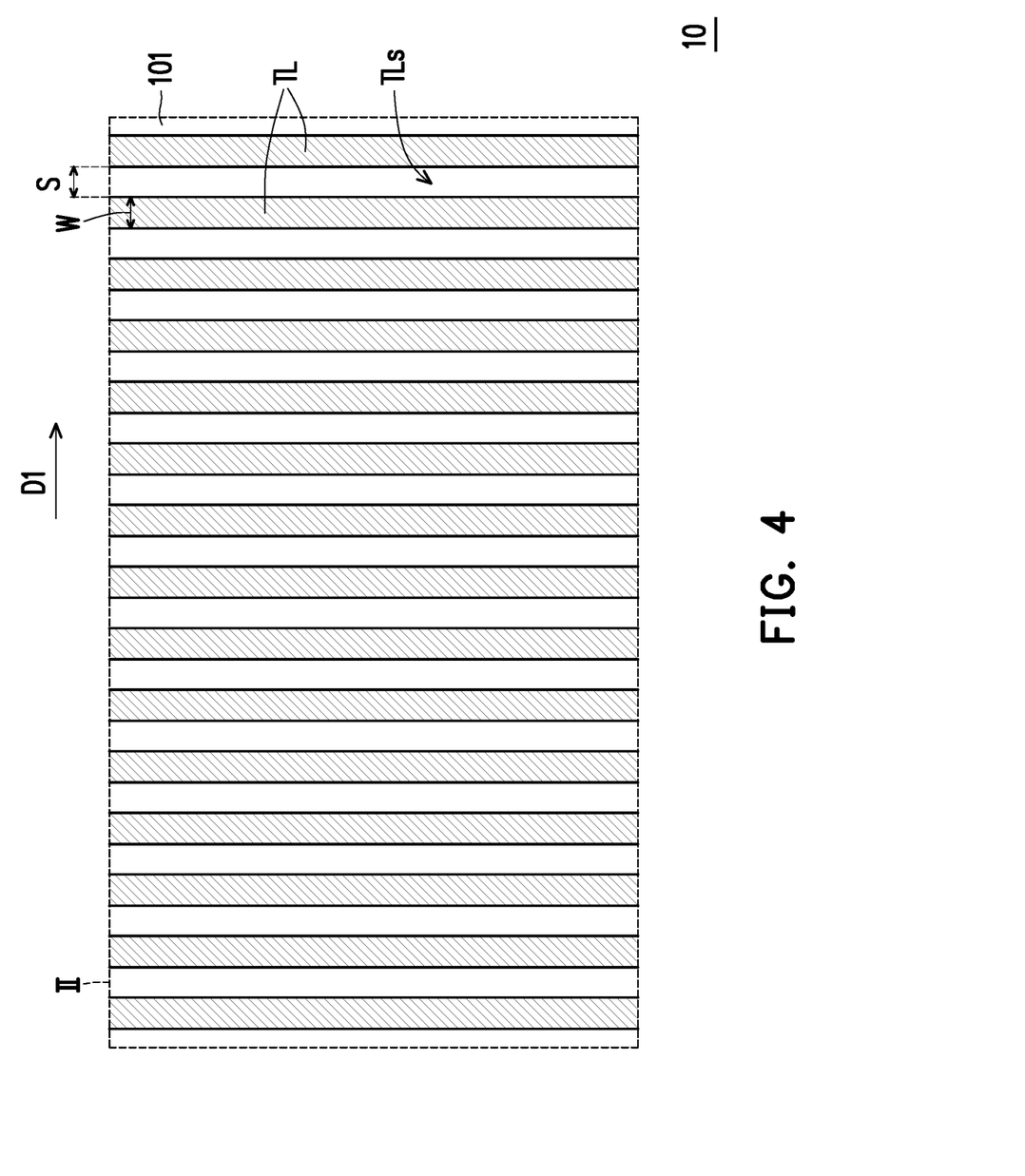

FIG. 1 is a schematic top view of a display panel according to an embodiment of the present disclosure. FIG. 2 is a schematic cross-sectional view of the display panel of FIG. 1. FIG. 3 and FIG. 4 are enlarged schematic views of two partial regions of the display panel of FIG. 1, respectively. In particular, FIG. 3 and FIG. 4 correspond to a region I and a region II of FIG. 1, respectively, and for clarity of presentation, FIG. 1 omits depiction of a substrate 102, third signal lines SL3, a gate insulating layer 110, an active element T, an insulating layer 120, an insulating layer 130, a flat layer 140, an isolation structure layer 150, a light emitting structure ES, a spacer PS and a common electrode CE of FIG. 2, and FIG. 4 omits depiction of a sealant pattern 200 of FIG. 1.

Referring to FIG. 1 and FIG. 2, the display panel 10 includes two substrates 101 and 102 as well as a pixel driving layer 100. The pixel driving layer 100 is disposed between the substrate 101 and the substrate 102, and the substrate 101 includes a package region SR and a display region DR surrounding the package region SR. In the present embodiment, the display panel 10 may further include a hole 10a penetrating through the two substrates 101 and 102 and the pixel driving layer 100, wherein the display region DR may surround the hole 10a and the package region SR is located between the hole 10a and the display region DR. For example, the vertical projection profile of the hole 10a on the substrate 101 may be circular. However, the present disclosure is not limited thereto, and in other embodiments, the vertical projection profile of the hole on the substrate 101 may be polygonal, or other suitable shapes. It should be noted that the number of the holes 10a of the present embodiment is exemplarily described by way of an example, and those skilled in the art will appreciate that the number, shape and arrangement of the holes of the display panel may be adjusted according to practical requirements.

Further, the display panel 10 also includes a sealant pattern 200. The sealant pattern 200 is disposed in the package region SR and sandwiched between the pixel driving layer 100 and the substrate 102. In the present embodiment, the sealant pattern 200 surrounds the hole 10a of the display panel 10, the vertical projection of the sealant pattern 200 on the substrate 101 may be ring-shaped, that is, the vertical projection profile (namely an inner profile) of a side wall, adjacent to the hole 10a, of the sealant pattern 200 on the substrate 101 may be conformal to the vertical projection profile of the hole 10a on the substrate 101, but the present disclosure is not limited thereto. In other embodiments, the vertical projection profile (for example, an inner profile or an outer profile) of the sealant pattern 200 on the substrate 101 may not be conformal to the vertical projection profile of the hole 10a on the substrate 101.

Specifically, the sealant pattern 200 is configured to bond the pixel driving layer 100 to the substrate 102. In the present embodiment, a method for forming the sealant pattern 200 (namely a package process) may include steps of coating a sealant material layer (for example, a frit layer) and sintering at a high temperature in the package region SR to form the sealant pattern 200, wherein the step of sintering at the high temperature cures the frit layer (namely a sealant material layer) into the sealant pattern 200 by irradiating the frit layer with laser light, and the temperature in a sintering process can be equal to or greater than 400° C. In the present embodiment, the material of the sealant pattern 200 is, for example, glass frit, and the material of the glass frit may include manganese oxide (MnOx), zinc oxide (ZnO) and magnesium oxide (MgO). However, the present disclosure is not limited thereto, and in other embodiments, the material of the sealant pattern 200 may also include acrylic resin, epoxy resin, a photo-sensitive polymeric material, or other suitable sealing materials.

On the other hand, the pixel driving layer 100 includes a plurality of first signal lines SL1, a plurality of second signal lines SL2 and a plurality of pixel structures PX, and is disposed in the display region DR. Each pixel structure PX is electrically connected to one corresponding first signal line SL1 and one corresponding second signal line SL2. In the present embodiment, the first signal lines SL1 may be disposed on the substrate 101 in a direction D1 and extend in a direction D2. The second signal lines SL2 may be disposed on the substrate 101 in the direction D2 and extend in the direction D1. That is, the first signal lines SL1 may intersect with the second signal lines SL2. On the other hand, the pixel structures PX may surround the hole 10a. However, the present disclosure is not limited thereto, and according to other embodiments, the display panel may be provided with the pixel structures PX only in the vicinity of the partial periphery of the hole. That is, a plurality of pixel structures PX may not surround the hole 10a.

In the present embodiment, the first signal lines SL1 are, for example, data lines, the second signal lines SL2 are, for example, scan lines, and the material of the signal lines (for example, the first signal lines SL1 and the second signal lines SL2) is generally a metallic material based on conductivity considerations. However, the present disclosure is not limited thereto, and according to other embodiments, other conductive materials may be used for the first signal lines SL1 and the second signal lines SL2, such as alloys, nitrides of metallic materials, oxides of metallic materials, oxynitrides of metallic materials, or other suitable materials, or stack layers of metallic materials and other conductive materials.

Further, the pixel driving layer 100 further includes a plurality of signal transfer lines TL and an insulating layer 120. The signal transfer lines TL are disposed in the package region SR and are overlapped with the sealant pattern 200 in a normal direction of the substrate 101. The insulating layer 120 is disposed between the first signal lines SL1 and the signal transfer lines TL. In the present embodiment, each signal transfer line TL may have two straight segment portions TLa and one curved segment portion TLb. The curved segment portion TLb is connected between the two straight segment portions TLa, and the vertical projection of the curved segment portion TLb on the substrate 101 can be conformal to the vertical projection profile of the hole 10a (or the sealant pattern 200) on the substrate 101, but the present disclosure is not limited thereto. In other embodiments, the signal transfer line TL may also have another suitably contoured extending path, and the vertical projection of the extending path on the substrate 101 may not be conformal to the vertical projection profile of the hole 10a (or the sealant pattern 200) on the substrate 101.

Referring to FIG. 2 and FIG. 3, the substrate 101 may also have a transfer region TR between the display region DR and the package region SR. The insulating layer 120 is provided with a plurality of contact vias 120a located in the transfer region TR, and some of the first signal lines SL1 may extend from the display region DR to the transfer region TR and are electrically connected to the signal transfer lines TL through the contact vias 120a. In other words, some of the first signal lines SL1 extending from the display region DR to one side of the transfer region TR may be electrically connected to the other first signal lines SL1 extending from the display region DR to the other side of the transfer region TR via the signal transfer lines TL located in the package region SR. Accordingly, the circumstance that some of the first signal lines SL1 occupy additional configuration space in order to be away from the hole 10a to cause reduction of the displayable region of the display region DR can be avoided, that is, maximization of the displayable region of the display panel can be ensured.

In the present embodiment, the materials of the signal transfer lines TL and the second signal lines SL2 can be the same; that is, the signal transfer lines TL and the second signal lines SL2 may be formed on the same film layer, but the present disclosure is not limited thereto. It should be noted that, in the present embodiment, the number of the contact vias 120a for electrically connecting the first signal line SL1 with one corresponding signal transfer line TL is exemplarily illustrated by three examples, but it does not represent the present disclosure is limited by the contents illustrated in the drawings.

It is noted that the coefficient of thermal expansion (CTE) of the signal transfer lines TL overlapped with the sealant pattern 200 is smaller than the coefficient of thermal expansion of the first signal lines SL1. For example, the material of the signal transfer lines TL may include molybdenum, but the material of the first signal lines SL1 may include aluminum. Still further, the coefficient of thermal expansion of the signal transfer lines TL may be between 4.8 ($10^{-6}$/K) and 14.2 ($10^{-6}$/K). Accordingly, peeling of the signal transfer lines TL due to a high temperature (for example, a temperature equal than or greater than 400° C.) during the foregoing package process and failure of package can be effectively avoided, and thus, the package yield and reliability of the display panel 10 are improved.

It can be seen from FIG. 4 that the signal transfer lines TL have a width W in the direction D1, any two adjacent signal transfer lines TL are spaced from each other by a distance S in the direction D1, wherein the width W of the signal transfer lines TL may be between 3 μm and 25 μm, and the distance S between any two adjacent signal transfer lines TL may be between 1 μm and 50 μm. In the present embodiment, the ratio of the width W of the signal transfer lines TL to the distance S between any two adjacent signal transfer lines TL may be between 0.5 and 3. In another aspect, a gap TLs is formed between each two adjacent signal transfer lines TL, and the percentage of the vertical projection area of the region occupied by the gaps TLs on the substrate 101 relative to the total vertical projection area of the region occupied by the gaps TLs and the signal transfer lines TL defining the gaps TLs on the substrate 101 may be between 25% and 60%. Thus, the heat dissipation effect of the signal transfer lines TL in the step of sintering at the high temperature may be improved, the conversion rate of the sealant pattern 200 is increased, and the package yield and reliability of the display panel 10 can be further improved.

Referring to FIG. 2, each pixel structure PX may include an active element T and a pixel electrode PE electrically connected to the active element T. The active element T includes a source electrode SE, a drain electrode DE, a gate G and a semiconductor pattern SC, wherein the semiconductor pattern SC is electrically connected between the source electrode SE and the drain electrode DE, and the source electrode SE and the drain electrode DE can be electrically connected to the first signal line SL1 and the pixel electrode PE, respectively. In the present embodiment, the pixel electrode PE may be a reflective electrode including a metal, an alloy, a nitride of a metal material, an oxide of a metal material, an oxynitride of a metal material, or other suitable material, or a stack layer of a metal material and other conductive materials. However, the present disclosure is not limited thereto. In other embodiments, the pixel electrode PE may be a light-transmissive electrode, and the material of the transmissive electrode includes a metal oxide, for example: indium tin oxide, indium zinc oxide, aluminum tin oxide, aluminum zinc oxide, or other suitable oxide, or a stack layer of at least two of the foregoing components.

In the present embodiment, the gate G of the active element T is selectively disposed above the semiconductor pattern SC, that is, the active element T is a top-gate thin film transistor (top-gate TFT). However, the present disclosure is not limited thereto. In other embodiments, the gate G of the active element T may also be disposed below the semiconductor pattern SC, that is, the active element T may also be a bottom-gate thin film transistor (bottom-gate TFT). On the other hand, in the present embodiment, the active element T may be a low temperature poly-silicon thin film transistor (LTPS TFT). However, the present disclosure is not limited thereto, and in other embodiments, the active element T may also be an amorphous silicon thin film transistor (a-Si TFT), a microcrystalline silicon thin film transistor (micro-Si TFT), or a metal oxide transistor.

For example, a method for forming the active element T may include the following steps: the semiconductor pattern SC, the gate insulating layer 110, the gate G, the insulating layer 120, the source electrode SE and the drain electrode DE are sequentially formed on the substrate 101, wherein the source electrode SE is electrically connected to the semiconductor pattern SC through the contact vias 115*a* formed in the gate insulating layer 110 and the insulating layer 120, and the drain electrode DE is electrically connected to the semiconductor pattern SC through the contact vias 115*b* formed in the gate insulating layer 110 and the insulating layer 120, but the present disclosure is not limited thereto. In the present embodiment, the materials of the gate G, the signal transfer lines TL and the second signal lines SL2 (shown in FIG. 3) may be selectively the same, and the materials of the source electrode SE, the drain electrode DE and the first signal lines SL1 may be selectively the same; that is, the gate G, the signal transfer lines TL and the second signal lines SL2 may be formed on the same film layer, and the source electrode SE, the drain electrode DE and the first signal lines SL1 may be formed on the same film layer.

In the present embodiment, the pixel driving layer 100 may further include the insulating layer 130 and the flat layer 140 which are sequentially stacked on the insulating layer 120. The insulating layer 130 may cover some of the surfaces of the source electrode SE and the drain electrode DE of the active element T and the insulating layer 120. Specifically, the pixel driving layer 100 is connected to the sealant pattern 200 through the upper surface 130*s* of the insulating layer 130. On the other hand, the pixel electrode PE is disposed on the flat layer 140 and penetrates through the flat layer 140 and the insulating layer 130 to be electrically connected to the drain electrode DE of the active element T. In the present embodiment, the materials of the gate insulating layer 110, the insulating layer 120 and the insulating layer 130 may include inorganic materials (for example: silicon oxide, silicon nitride, silicon oxynitride, other suitable materials, or stack layers of at least two of the foregoing materials), organic materials, or other suitable materials, or combinations of the foregoing materials. In addition, the material of the flat layer 140 is, for example, an organic insulating material which may include polyimide, polyester, benzocyclobutene (BCB), polymethylmethacrylate (PMMA), poly(4-vinylphenol) (PVP), polyvinyl alcohol (PVA), polytetrafluoroethene (PTFE) and hexamethyldisiloxane (HMDSO).

Further, the display panel 10 may further include a light emitting structure ES, an isolation structure layer 150 and a common electrode CE which are disposed on the pixel driving layer 100. The isolation structure layer 150 covers a part of the surface of the flat layer 140 and a part of the surface of the pixel electrode PE, and is provided with a groove 150*a* overlapped with the pixel electrode PE, wherein the light emitting structure ES can be disposed in the groove 150*a*. On the other hand, the display panel 10 may also optionally include a plurality of spacers PS. The spacers PS are disposed on the isolation structure layer 150 and configured to support the substrate 102. In the present embodiment, the material of the isolation structure layer 150 includes an inorganic material (for example: silicon oxide, silicon nitride, silicon oxynitride, other suitable materials, or stack layers of at least two of the foregoing materials), an organic materials (for example: polyesters (PET), polyenes, polypropionyls, polycarbonates, polyalkylene oxides, polyphenylenes, polyethers, polyketones, polyols, polyaldehydes, or other suitable materials, or combinations of the foregoing components), or other suitable materials, or combination of the foregoing materials.

In the present embodiment, the light emitting structure ES may include an electron hole injection layer HIL, an electron hole transport layer HTL, a light emitting layer EML and an electron transport layer ETL which are sequentially stacked on the pixel electrode PE. The common electrode CE covers a part of the surface of the isolation structure layer 150 and the spacers PS, and extends into the groove 150*a* to cover the electron transport layer ETL. When the display panel 10 is enabled, a current is generated owing to a high potential and a ground potential between the pixel electrode PE and the common electrode CE, respectively, so that the light emitting structure ES emits an image beam for displaying a picture. That is, in the present embodiment, the display panel 10 may be an organic light emitting diode (OLED) panel, a micro light emitting diode (Micro LED) panel, or a mini light emitting diode (Mini LED) panel, but the present disclosure is not limited thereto. In other embodiments, the display panel may also be a liquid crystal display panel (LCD panel).

Referring to FIG. 1 and FIG. 3, in the present embodiment, in order not to occupy additional configuration space, some of the second signal lines SL2 (namely the second signal lines SL2 with the extending paths passing through the package region SR) are not designed to be away from the package region SR (or the hole 10*a*). Accordingly, the display panel 10 may further include a first gate driving circuit 181 and a second gate driving circuit 182, wherein some of the second signal lines SL2 may be electrically connected to the first gate driving circuit 181, and the other second signal lines SL2 may be electrically connected to the second gate driving circuit 182. In particular, in the extending direction (namely the direction D1) of the second signal lines SL2, the extending path is electrically connected to the first gate driving circuit 181 through some of the second signal lines SL2 of the package region SR (for example, the second signal lines SL2 located on the side, close to the first gate driving circuit 181, of the package region SR), the extending path is electrically connected to the second gate driving circuit 182 through the other second signal lines SL2 of the package region SR (for example, the second signal lines SL2 on the side, close to the second gate driving circuit 182, of the package region SR). That is, in the present embodiment, the display panel 10 can be operated in a double-sided gate driving manner to prevent some of the second signal lines SL from occupying additional configuration space due to the fact that the extending path of the second signal lines SL need to be away from the package region SR (or the hole 10*a*) to cause reduction of the displayable region of the display region DR, that is, maximization of the displayable region of the display panel can be ensured.

In the following, another embodiment will be set forth to explain the present disclosure in detail, wherein the same reference numerals are used to designate the same elements, descriptions of the same technical contents will be omitted, reference will be made to the foregoing embodiments in the omitted portions, and the descriptions thereof are omitted below.

Figure 5:
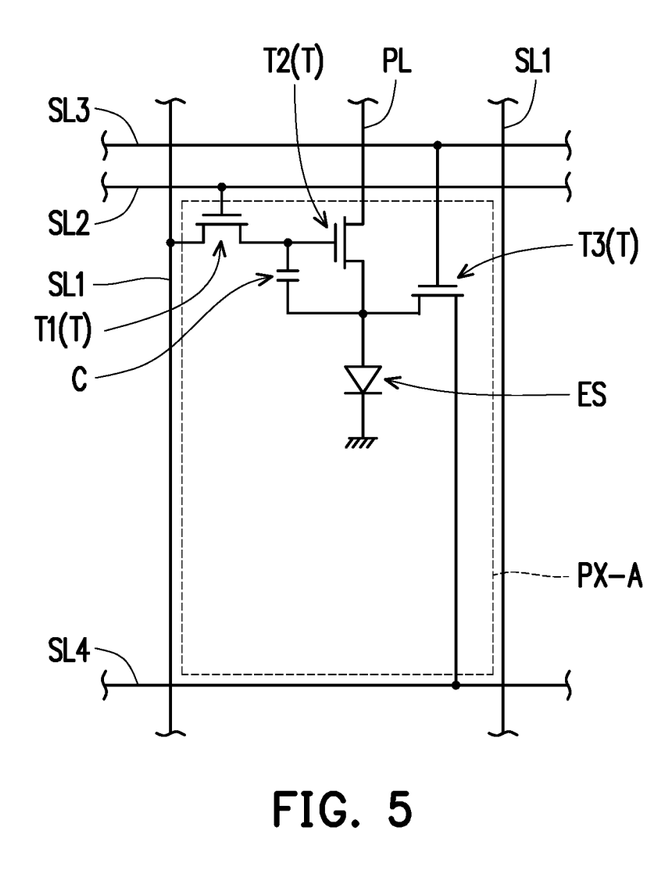
FIG. 5 is an equivalent circuit diagram of a pixel structure according to another embodiment of the present disclosure.
Figure 6:
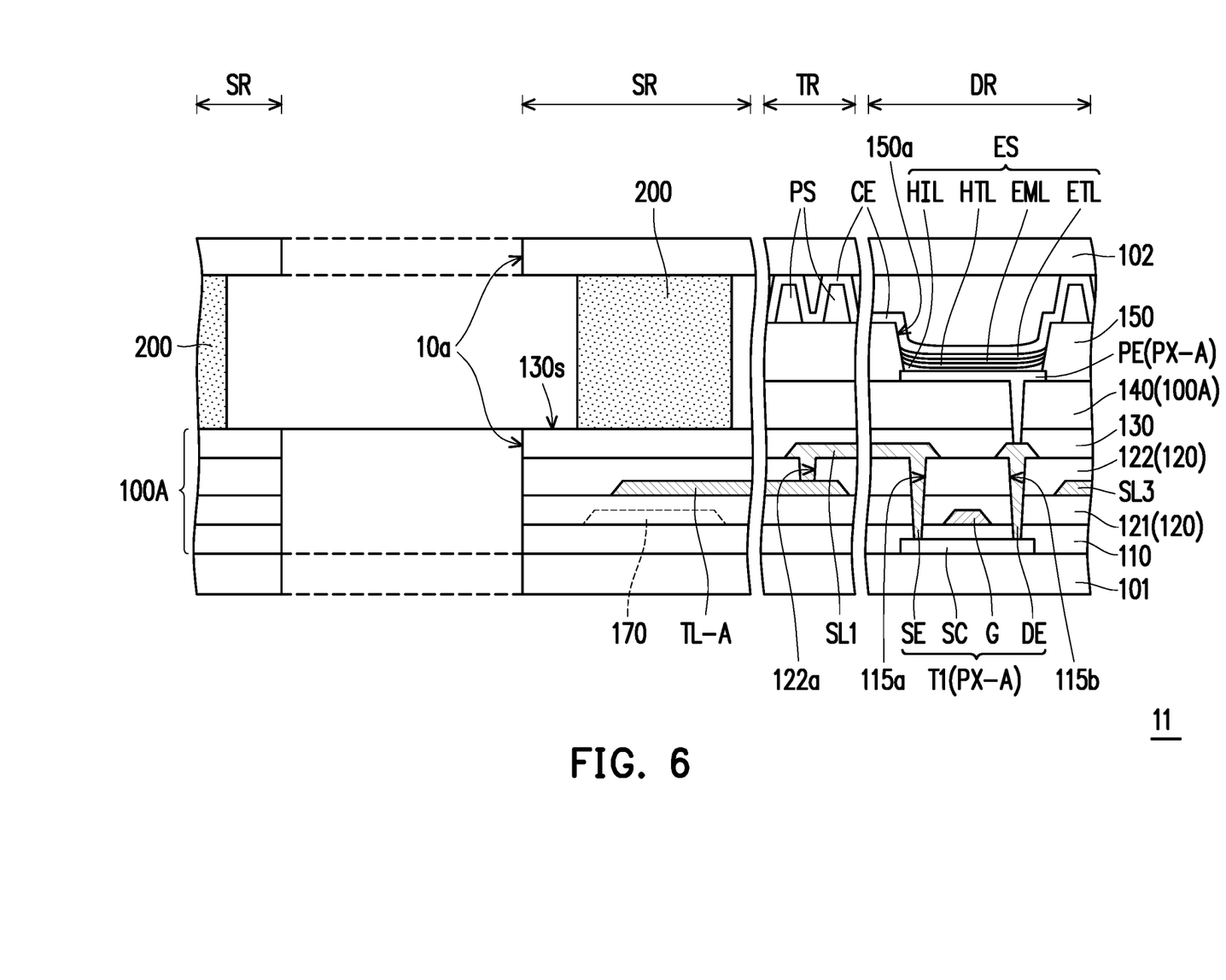
FIG. 6 is a schematic cross-sectional view of the display panel according to another embodiment of the present disclosure.
Figure 7:
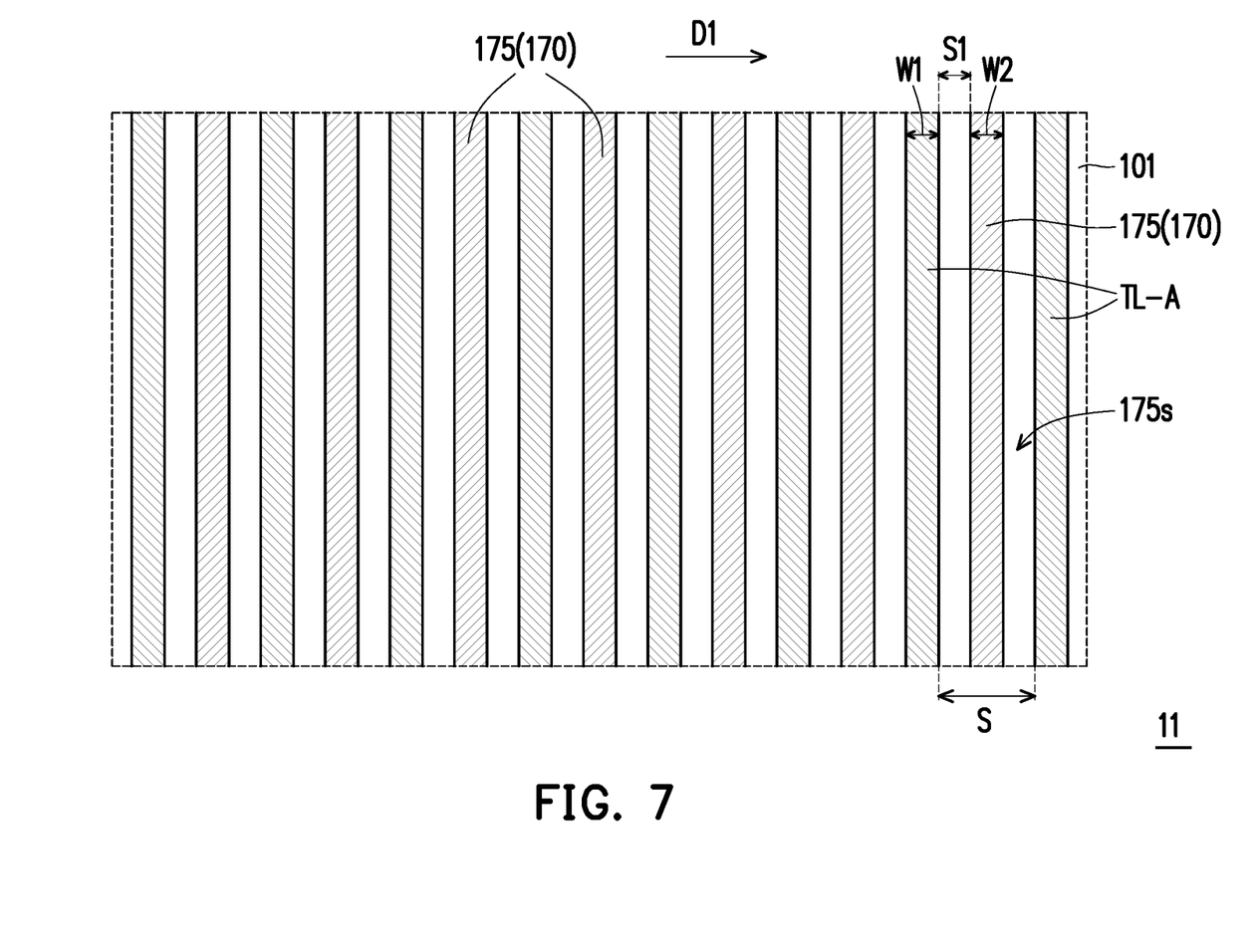
FIG. 7 is a schematic top view of a partial region of the display panel according to another embodiment of the present disclosure.

FIG. 5 is an equivalent circuit diagram of a pixel structure according to another embodiment of the present disclosure. FIG. 6 is a schematic cross-sectional view of the display panel according to another embodiment of the present disclosure. FIG. 7 is a schematic top view of a partial region of the display panel according to another embodiment of the present disclosure. It should be noted that, for clarity of presentation, FIG. 7 depicts only a signal transfer line TL-A and a metal pattern layer 170 of the pixel driving layer 100A of FIG. 6.

Referring to FIG. 5 and FIG. 6, the main difference between the display panel 11 of the present embodiment and the display panel 10 of the foregoing embodiment is as follows: the pixel structures, the signal lines and the signal transfer lines are configured differently. In the present embodiment, the pixel structure PX-A may optionally include three active elements T and one capacitor C, that is, the pixel structure PX-A of the present embodiment is exemplified by a 3T1C architecture, but the present disclosure is not limited thereto. In other embodiments, the pixel structure may also be a 1T1C architecture, a 2T1C architecture, a 3T2C architecture, a 4T1C architecture, a 4T2C architecture, a 5T1C architecture, a 5T2C architecture, a 6T1C architecture, or a 6T2C architecture, a 7T1C architecture, or any possible architecture.

In the present embodiment, the pixel driving layer 100A may further include a third signal line SL3, a fourth signal line SL4 and a power line PL, and the three active elements T of the pixel structure PX-A are a first active element T1, a second active element T2 and a third active element T3, respectively. For example, the first active element T1 is, for example, a switch active element (switch TFT), the second active element T2 is, for example, a drive active element (drive TFT), and the third active element T3 is, for example, a sense active element (sense TFT). On the other hand, the third signal line SL3 is, for example, a scan line, and the fourth signal line SL4 is, for example, a sense line.

In detail, the first active element T1 may be electrically connected to the first signal line SL1, the second signal line SL2, the capacitor C and the second active element T2. The second active element T2 may be electrically connected to the capacitor C, the third active element T3 and the light emitting structure ES, and may be electrically connected to a high voltage source (not shown) through a power line PL. The third active element T3 may be electrically connected to the third signal line SL3, the fourth signal line SL4, the light emitting structure ES and the capacitor C. In the present embodiment, the materials of the third signal line SL3, the fourth signal line SL4 and the power line PL are generally metal materials based on the conductivity considerations. However, the present disclosure is not limited thereto, and according to other embodiments, other conductive materials may be used for the third signal line SL3, the fourth signal line SL4 and the power line PL, for example: alloys, nitrides of metallic materials, oxides of metallic materials, oxynitrides of metallic materials, or other suitable materials, or stack layers of metallic materials and other conductive materials.

Further, as shown in FIG. 6, the insulating layer 120 of the pixel driving layer 100A may be a stack layer of a first sub-insulating layer 121 and a second sub-insulating layer 122, and the third signal line SL3 is disposed between the first sub-insulating layer 121 and the second sub-insulating layer 122. In the present embodiment, the materials of the signal transfer line TL-A and the third signal line SL3 may be selectively the same; that is, the signal transfer line TL-A and the third signal line SL3 may be formed on the same film layer, and the first signal line SL1 may be electrically connected to the signal transfer line TL-A through a contact via 122a of the second sub-insulating layer 122. It should be noted that in the present embodiment, the material of the third signal line SL3 may include molybdenum.

Referring to FIG. 6 and FIG. 7, in the present embodiment, the pixel driving layer 100A may further optionally include a metal pattern layer 170 disposed in the package region SR, and the metal pattern layer 170 and the gate G may be formed on the same film layer. In other words, the metal pattern layer 170 and the signal transfer line TL-A are different film layers. In the present embodiment, the metal pattern layer 170 may be a plurality of metal lines 175 disposed in the direction D1, and the metal lines 175 are not overlapped with the signal transfer lines TL-A in the normal direction of the substrate 101. However, the present disclosure is not limited thereto, and according to other embodiments, the metal pattern layer may also be partially overlapped with the signal transfer lines in the normal direction of the substrate 101.

It can be seen from FIG. 7 that the signal transfer lines TL-A and the metal lines 175 can be alternately disposed in the direction D1. The signal transfer lines TL-A and the metal lines 175 have a first width W1 and a second width W2 respectively in the direction D1, a first distance S1 exists between the adjacent signal transfer lines TL-A and the metal lines 175 in the direction D1, wherein the first width W1 and the second width W2 may be between 3 μm and 25 μm, and the first distance S1 may be between 1 μm and 50 μm. In the present embodiment, the first width W1 of the signal transfer lines TL-A may be substantially equal to the second width W2 of the metal lines 175, and the ratio of the first width W1 (or the second width W2) to the first distance S1 may be between 0.5 and 3.

From another perspective, since gaps 175s are formed between any adjacent signal transfer lines TL-A and the metal lines 175, and the percentage of the vertical projection area of the region occupied by the gaps 175s on the substrate 101 relative to the total vertical projection area of the region occupied by the signal transfer lines TL-A, the metal lines 175 and the gaps 175s on the substrate 101 may be between 25% and 60%. Accordingly, the heat dissipation effect of the signal transfer line TL-A in the step of sintering at the high temperature can be improved, and the conversion rate of the sealant pattern 200 can be increased, and thus, the package yield and reliability of the display panel 11 are improved. It should be noted that through the configuration of the metal pattern layer 170, a distance S in the direction D1 between any two adjacent signal transfer lines TL-A can be added to reduce the risks of electrical short-circuit (or electrostatic explosion injuries) between any two adjacent signal transfer lines TL-A.

Based on the above, in the display panel according to one embodiment of the present disclosure, the package region is provided with the signal transfer line overlapped with the sealant pattern, and the first signal line for driving the pixel structure is electrically connected to the signal transfer line. Accordingly, the display panel can transmit the driving signal from the first signal line of the display region to the signal transfer line located in the package region or transmit the driving signal from the signal transfer line of the package region to the first signal line located in the display region so as to ensure that the displayable region of the display panel is maximized. In addition, in the display panel according to another embodiment of the present disclosure, through the fact that the coefficient of thermal expansion of the signal transfer line is between 4.8 ($10^{-6}$/K) and 14.2 ($10^{-6}$/K), the signal transfer line can be prevented from being peeled off due to high temperature in the package process and causing package failure, and the package yield and the operation reliability of the display panel can be improved.

Although the present disclosure is described with reference to the above embodiments, the embodiments are not intended to limit the present disclosure. A person of ordinary skill in the art may make variations and modifications without departing from the spirit and scope of the present disclosure. Therefore, the protection scope of the present disclosure should be subject to the appended claims.

What is claimed is:

1. A display panel, comprising:
    a substrate, having a package region, a display region surrounding the package region and a transfer region positioned between the package region and the display region;
    a plurality of pixel structures, disposed in the display region;
    a plurality of first signal lines and a plurality of second signal lines, disposed in the display region, wherein each of the pixel structures is electrically connected to one corresponding first signal line and one corresponding second signal line;
    a plurality of signal transfer lines and a sealant pattern, disposed in the package region, the sealant pattern being overlapped with the signal transfer lines, wherein a coefficient of thermal expansion of the signal transfer lines is smaller than a coefficient of thermal expansion of the first signal lines; and
    an insulating layer, disposed between the first signal lines and the second signal lines, wherein the insulating layer is provided with a plurality of contact vias overlapped with the transfer region, and the first signal lines are electrically connected to the signal transfer lines through the contact vias.

2. The display panel according to claim 1, further comprising a hole, wherein the display region surrounds the hole, and the package region is positioned between the hole and the display region.

3. The display panel according to claim 1, wherein the signal transfer lines and the second signal lines belong to the same film layer.

4. The display panel according to claim 1, further comprising a plurality of third signal lines disposed in the display region, the insulating layer comprising a first sub-insulating layer and a second sub-insulating layer, wherein the third signal lines are positioned between the first sub-insulating layer and the second sub-insulating layer, and the signal transfer lines and the third signal lines belong to the same film layer.

5. The display panel according to claim 4, further comprising a metal pattern layer, disposed in the package region, the metal pattern layer being positioned between the insulating layer and the substrate, wherein the signal transfer lines are not overlapped with the metal pattern layer.

6. The display panel according to claim 5, wherein the metal pattern layer and the second signal lines belong to the same film layer.

7. The display panel according to claim 1, further comprising a first gate driving circuit and a second gate driving circuit, wherein a portion of the second signal lines are electrically connected to the first gate driving circuit, and the other portion of the second signal lines are electrically connected to the second gate driving circuit.

8. The display panel according to claim 1, wherein a gap is formed between every adjacent two of the signal transfer lines, and a percentage of a vertical projection area of a region occupied by the gaps on the substrate relative to a vertical projection area of a region occupied by the signal transfer lines and the gaps on the substrate is between 25% and 60%.

9. The display panel according to claim 1, wherein a distance exists between any two adjacent signal transfer lines in a first direction, each of the signal transfer lines has a width in the first direction, and a ratio of the width of each of the signal transfer lines relative to the distance between any two adjacent signal transfer lines is between 0.5 and 3.

10. The display panel according to claim 1, wherein materials of the signal transfer lines comprise molybdenum.

11. The display panel according to claim 1, wherein the coefficient of thermal expansion of the signal transfer lines is between 4.8 ($10^{-6}$/K) and 14.2 ($10^{-6}$/K).

12. The display panel according to claim 1, further comprising a plurality of light emitting structures, wherein the plurality of light emitting structures are electrically connected to the pixel structures, respectively, and each of the light emitting structures comprises an electron hole injection layer, an electron hole transport layer, a light emitting layer and an electron transport layer that are sequentially stacked.

13. The display panel according to claim 1, wherein a material of the sealant pattern comprises a glass frit with a sintering temperature greater than 400° C.

14. A display panel, comprising:
    a substrate, having a package region and a display region surrounding the package region;
    a plurality of pixel structures, disposed in the display region;
    a first signal line and a plurality of second signal lines, disposed in the display region, wherein each of the pixel structures is electrically connected to the first signal line and one corresponding second signal line;
    a signal transfer line, disposed in the package region, wherein the signal transfer line is electrically connected to the first signal line, and a coefficient of thermal expansion of the signal transfer line is between 4.8 ($10^{-6}$/K) and 14.2 (10–6/K); and
    a sealant pattern, disposed in the package region, wherein the sealant pattern is overlapped with the signal transfer line.

15. The display panel according to claim 14, further comprising a hole, wherein the display region surrounds the hole, and the package region is positioned between the hole and the display region.

16. The display panel according to claim 14, wherein a material of the signal transfer line comprises molybdenum.

17. The display panel according to claim 14, further comprising an insulating layer, disposed between the first signal line and the second signal lines, the substrate being provided with a transfer region positioned between the package region and the display region, wherein the insulating layer is provided with at least one contact via overlapped with the transfer region, and the first signal line is electrically connected to the signal transfer line through the at least one contact via.

18. The display panel according to claim 17, wherein the signal transfer line and the second signal lines belong to the same film layer.

19. The display panel according to claim 17, further comprising a third signal line disposed in the display region, the insulating layer comprising a first sub-insulating layer and a second sub-insulating layer, wherein the third signal line is positioned between the first sub-insulating layer and the second sub-insulating layer, and the signal transfer line and the third signal line belong to the same film layer.

20. The display panel according to claim 19, further comprising a metal pattern layer, disposed in the package region, the metal pattern layer being positioned between the insulating layer and the substrate, wherein the signal transfer line is not overlapped with the metal pattern layer, and the metal pattern layer and the second signal lines belong to the same film layer.

\* \* \* \* \*